Figure 1:
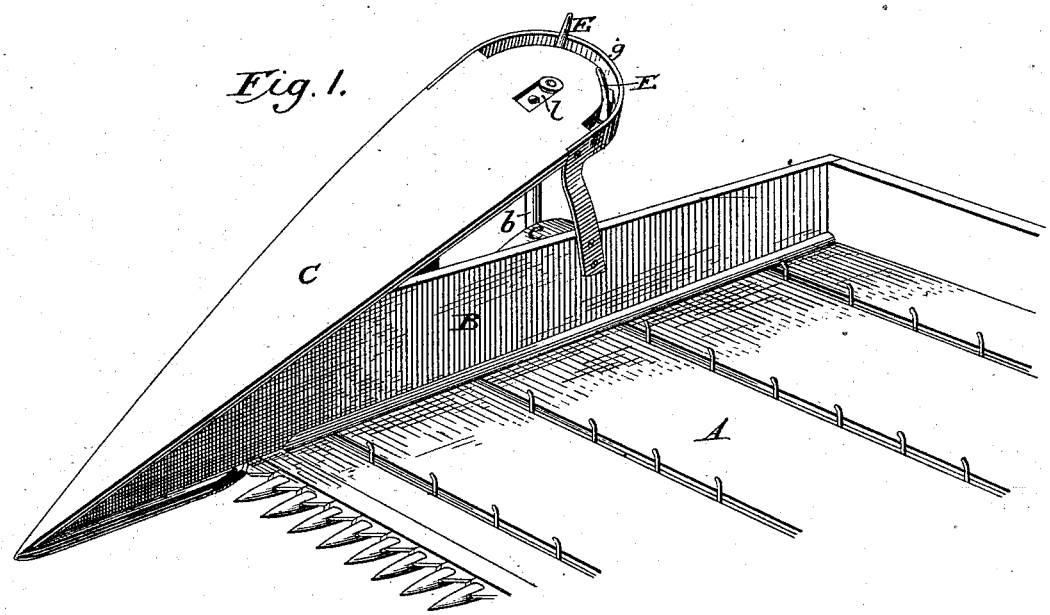

(No Model.) 6 Sheets—Sheet 1.
J. F. GORDON.
GRAIN HARVESTING MACHINE.

No. 283,097. Patented Aug. 14, 1883.

Attest.
Sidney P. Hollingsworth
Newton Wyckoff

Inventor.
J. F. Gordon,
By his Attorney
Philip T. Dodge (No Model.) 6 Sheets—Sheet 2.
J. F. GORDON.
GRAIN HARVESTING MACHINE.
No. 283,097. Patented Aug. 14, 1883.
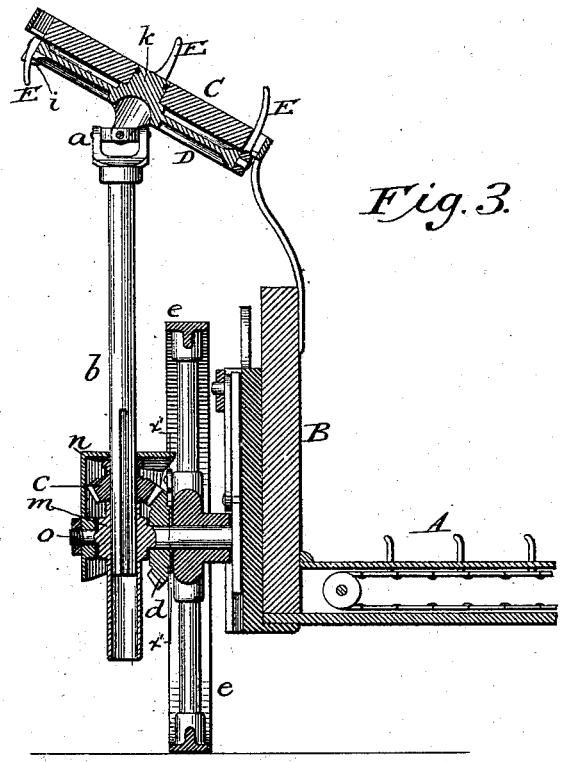
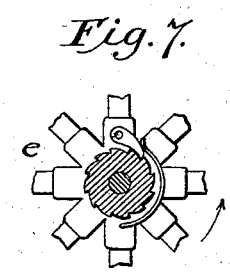
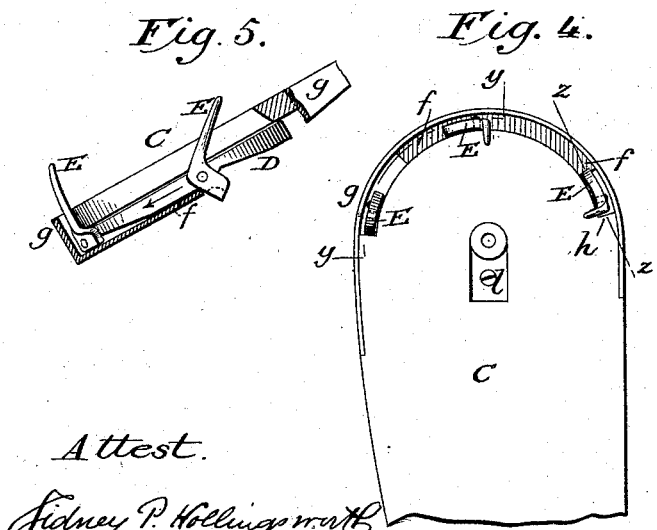
Attest.
Sidney P. Hollingsworth
Newton Wyckoff
Inventor:
J. F. Gordon
By his Attorney
Philip T. Dodge.

(No Model.) 6 Sheets—Sheet 3.
J. F. GORDON.
GRAIN HARVESTING MACHINE.
No. 283,097. Patented Aug. 14, 1883.
Fig. 8.
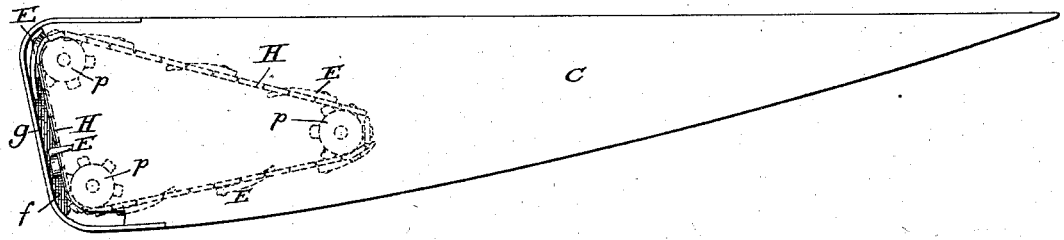
Fig. 9.
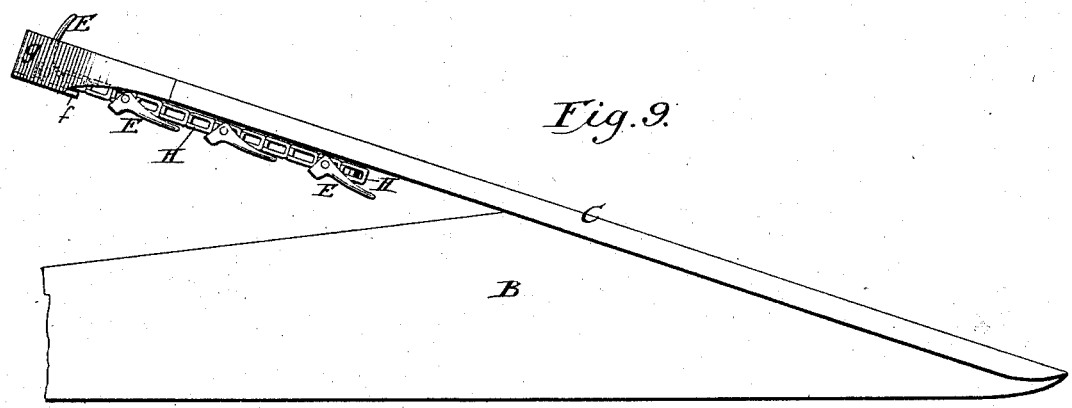
Fig. 10. Fig. 11.
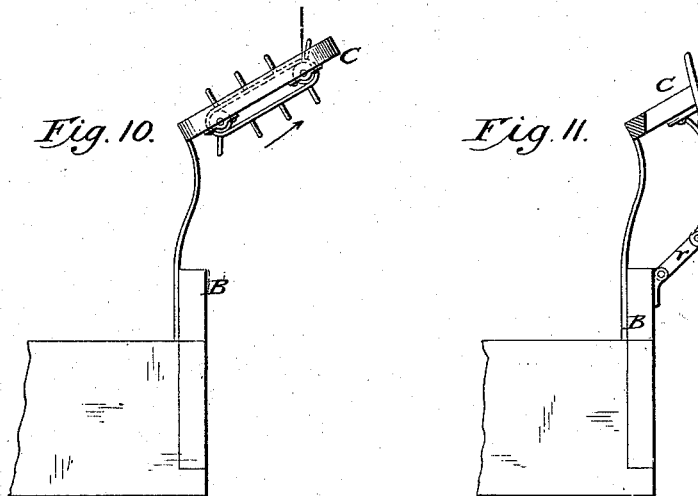
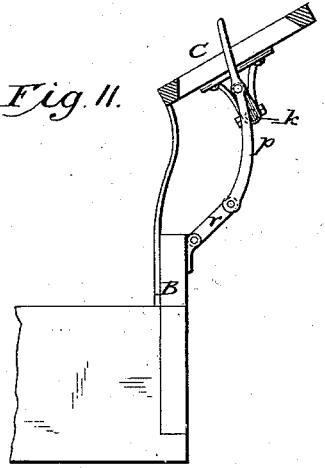
Attest. Inventor.
Sidney P. Hollingsworth James F. Gordon
Newton Wyckoff By his Attorney
Philip T. Dodge

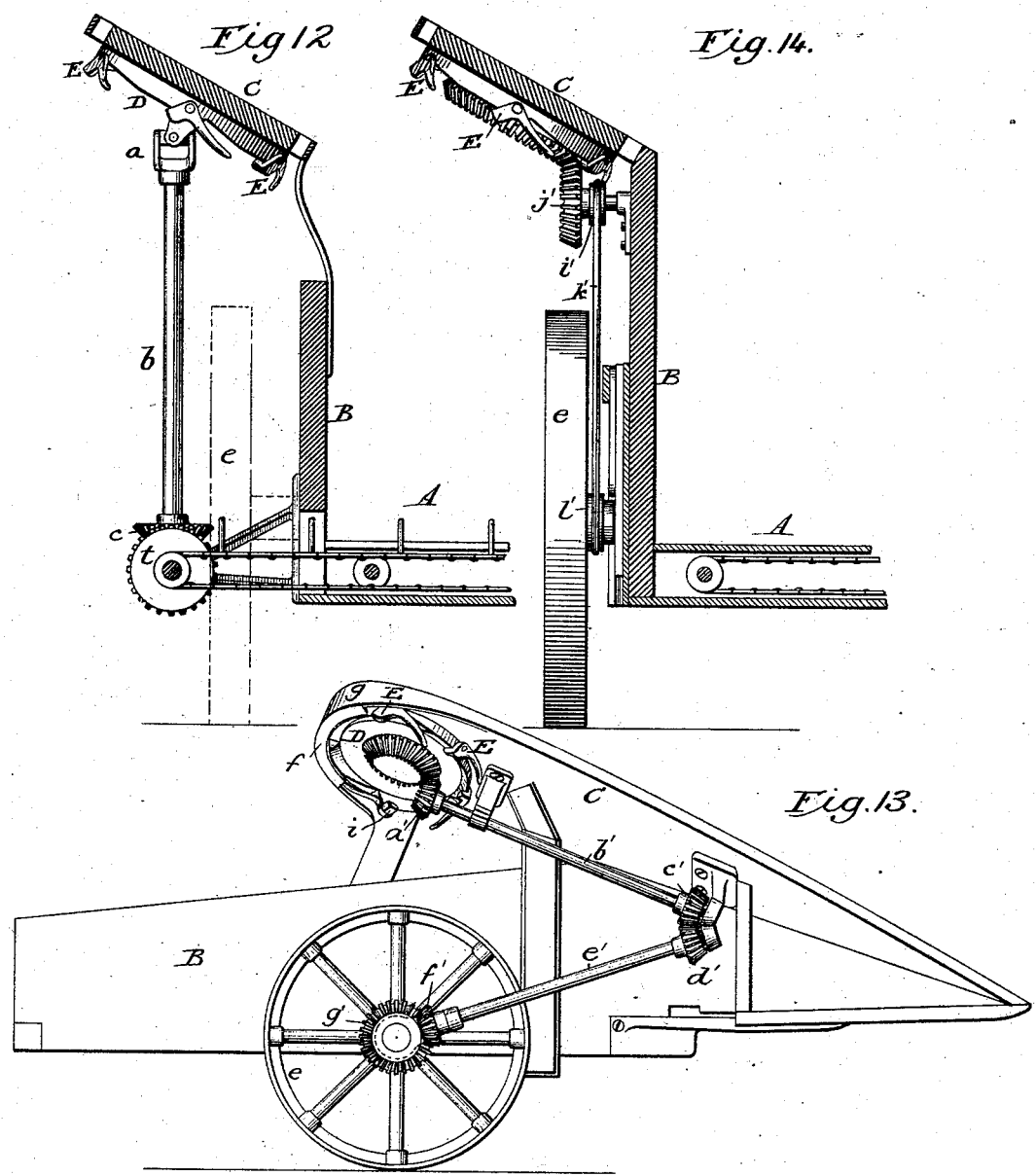

(No Model.) 6 Sheets—Sheet 5.
J. F. GORDON.
GRAIN HARVESTING MACHINE.

No. 283,097. Patented Aug. 14, 1883.

Attest.
Sidney P. Hollingsworth.
Harry Shipley

Inventor.
James F. Gordon.
By his Attorney
Philip T. Dodge (No Model.)  6 Sheets—Sheet 6.

J. F. GORDON.
GRAIN HARVESTING MACHINE.

No. 283,097. Patented Aug. 14, 1883.

Attest.
Sidney P. Hollingsworth
Newton Wyckoff

Inventor.
James F. Gordon
By his Attorney
Philip T. Dodge

UNITED STATES PATENT OFFICE.

JAMES F. GORDON, OF ROCHESTER, NEW YORK.

GRAIN-HARVESTING MACHINE.

SPECIFICATION forming part of Letters Patent No. 283,097, dated August 14, 1883.

Application filed February 28, 1883. (No model.)

*To all whom it may concern:*

Be it known that I, JAMES F. GORDON, of Rochester, in the county of Monroe and State of New York, have invented certain Improvements in Grain-Harvesting Machines, of which the following is a specification.

In operating harvesting-machines of the ordinary construction, particularly in lodged grain, much trouble is experienced, because of the cut grain leaning outward over and being detained at the head upon the divider at the outer or grain side of the platform, the result being that the butts, reaching the conveyer in advance of the heads, are carried around so that the grain is delivered in an irregular and tangled condition.

It is the aim of my invention to avoid this detention of the grain by the divider and cause the same to fall evenly and squarely upon the platform, in order that it may be delivered in a compact and even condition; and to this end the invention consists in a moving carrier or picker located at the grain side of the platform, and acting, at a point considerably in rear of the cutter-bar, to throw the heads of the falling grain inward toward the conveyer or platform, so that they may fall directly thereon. In this manner the grain is caused to fall squarely across the outer end of the conveyer from front to rear, and is consequently delivered in a regular and even condition, with the butts in line and all the stalks substantially parallel, instead of being crossed, broken, and entangled, as usual. This action is of the highest importance when the harvester is provided with an automatic binding mechanism, the successful action of which depends upon its receiving the grain in proper condition.

My carrier or picker may be constructed in a great variety of forms and driven by many different arrangements of mechanism, a number of which will hereinafter described, the only essential requirement being that it shall act upon the falling grain and throw the same inward.

I am aware that revolving and vibrating dividers extending from the cutter-bar or a point in advance of the same backward to a point near the rear edge of the platform have been used upon harvesters without success. It is to be noted as a peculiarity of my attachment that it has no action upon the grain at the forward edge of the platform, or near the cutter upon the butts of the grain, but that, on the contrary, its construction and arrangement are such that it acts upon or near the heads only of the falling grain, its action occurring at a considerable distance in rear of the cutter-bar, and being confined, as before stated, to the heads of the grain.

Figure 2:
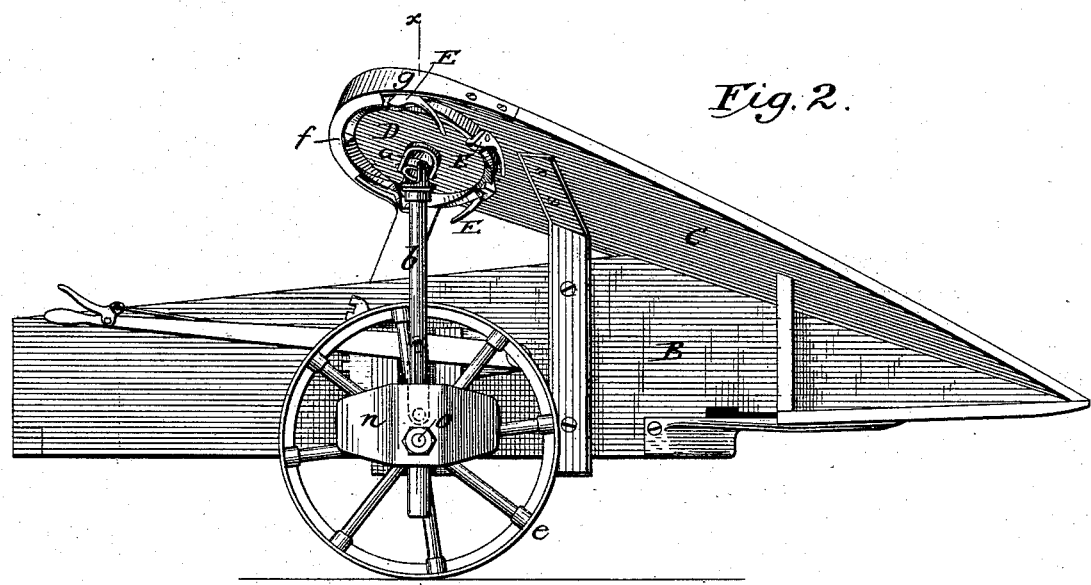

Referring to the accompanying drawings, Figure 1 is a perspective view of a harvester-platform and a divider with my improvement applied thereto. Fig. 2 is an outside elevation of the same. Fig. 3 is a transverse vertical section of the same on the line $x\ x$, Fig. 2. Fig. 4 is a top plan view of the divider and carrier. Figs. 5 and 6 are vertical sections on the lines $y\ y$ and $z\ z$ of Fig. 4, respectively. Fig. 7 is a section on the line $x'\ x'$ of Fig. 3. Fig. 7$^a$ is a section on the line $x''\ x''$ of Fig. 6. Figs. 8 to 18 are plan views, showing modified forms of the device.

Referring to Figs. 1 to 7, A represents the platform of the harvester, which will be provided with an endless apron or connected with a rake or other suitable conveying mechanism to deliver the grain therefrom. B represents the stationary grain-board at the outer or grain side of the machine, and C the stationary divider extending in advance of the cutter-bar, as usual. This divider-board is brought to a point at its forward end, and is of increasing width toward its rear end. It also has an upward inclination toward the rear as well as an inclination sidewise toward the platform, all as in machines of the ordinary construction. It is owing to the lodgment of heads of grain upon this board C that the difficulty is ordinarily encountered. For the purpose of removing this lodged grain, I mount beneath the outer end of the divider C a revolving disk or wheel, D, provided at its periphery with a series of folding or rising and falling fingers, E, arranged to rise successively above the rear end of the divider-board and sweep inward past the same for the purpose of forcing the falling grain inward toward the platform. The wheel D is connected by universal joint or coupling $a$ with an upright shaft, $b$, arranged to slide vertically at its lower end through a driving-pinion, c, which receives motion through a corresponding pinion, d, from the grain-wheel e, by which the outer end of the platform is carried in the usual manner. This arrangement of gearing imparts to the toothed wheel or disk D a rotary motion in the direction indicated by the arrow. The outer or rear end of the divider is curved concentrically with the wheel and made of such size that the fingers E upon the wheel may swing upward past and above its edge, as shown. The fingers are made of an angle or L shape, as shown in Figs. 5 and 6, pivoted to the outer edge of the wheel, and arranged to operate in connection with a stationary track or plate, f, secured around and below the outer edge of the wheel, as shown in Figs. 4, 5, and 6. The plate f may be secured in position in any suitable manner, but is preferably attached to and sustained by means of an outside rim or flange, g, secured at its ends to the divider-board, as shown. This rim g, encircling or extending around the outside of the disk and its fingers, serves to protect the latter from becoming entangled with the grain. As the rotation of the wheel or disk D brings each tooth toward the outer end of the divider-board the lower arm of the tooth engages against the end of the plate f in the manner shown in Fig. 5, whereby the tooth is caused to assume an upright position extending above the divider-board. The tooth thus elevated rides upon and is sustained in position by the plate f until it has passed around the end of the divider-board to the inner side, where the plate g terminates. Reaching the end of the plate, the lower arm or tooth passes therefrom, and at the same instant the upper end of the tooth, encountering the end or shoulder h of the divider-board, is turned downward thereby, in the manner represented in Fig. 6, the tooth being thus caused to fold down and pass forward and outward beneath the divider-board. It will thus be seen that during its movement around the outer end of the divider-board toward the platform each tooth assumes an upright position, but that during the remainder of its circuit it assumes a depressed position and passes beneath the board out of contact with the grain. The heads of grain resting upon the board are engaged by the successive teeth, and thus forced inward away from the board, so as to fall upon the platform of the conveyer without delay.

In order to limit the motion of the teeth as they assume a folded position, they are provided with shoulders or lugs i, to engage beneath the lower edge of the disk or carrying-wheel. The wheel may be sustained in any suitable manner; but it is preferred, as shown in the drawings, to provide it on the upper side with a peripherally-curved hub, k, which is seated in a hole in the divider-board, and secured by means of a stationary plate, l, attached to the board and seated in said groove, as plainly represented in Figs. 3 and 4.

In order to prevent the rotary carrier from being turned in a backward direction in the event of the ground-wheel e having its motion reversed, the latter is connected to the pinion d through the medium of a ratchet-wheel and pawl, the pawl being preferably pivoted to the ground-wheel and the ratchet-wheel formed upon the back of the pinion, as shown in Figs. 3 and 7ª. The pinion c may be sustained in any suitable manner. It is preferred, however, as shown in the drawings, to connect it with the shaft b by means of a spline or feather, and to give it support by means of a box or bearing, m, secured to the outer end of the journal, upon which the ground-wheel e revolves.

For the purpose of preventing the entrance of straw or other obstructive matters into the gearing, a shield or housing, n, of suitable form to inclose the gearing, is applied above the same around the shaft b and around a threaded neck, o, formed upon the box m, a nut being applied to said neck to secure the housing in position, as shown.

Under the above construction the proper relationship between the gears is maintained, and at the same time the shaft b is permitted to slide freely through the driving-pinion to accommodate itself to the vertical adjustment of the platform.

As an additional security against the entrance of grain into the parts, I attach to the outer end of the platform or to the divider a curved rod or fender, G, extending backward outside of the shaft b, as shown.

While the rotary wheel, with its feathering or folding fingers, as above described, is found to answer an excellent purpose in causing the grain to fall properly upon the conveyer, it may be preferable in certain cases to substitute other devices for the same purpose. A simple arrangement which may be substituted is that represented in Figs. 8 and 9, which represent, respectively, a plan view and a side elevation of the same. In this form of device the rotary wheel is replaced by an endless chain provided with folding fingers. This chain H, which may be of any suitable construction, is mounted upon guiding-pulleys p on the under side of the divider-board. Pivoted teeth E, similar to those described in connection with the preceding figures, are pivoted to the chain at suitable intervals, and arranged to act in connection with a stationary plate or track, by which they are caused to assume an upright position as they travel inward across the rear end of the divider-board, above which their ends will be projected. While moving downward and outward the teeth will remain in a folded or depressed position, the action being caused in the same manner and by the same means as in the preceding figures. The chain may be extended forward a greater or less distance, and the pulleys may be mounted and motion communicated thereto in any suitable manner. If desired, either one of the pulleys may be connected with the shaft $b$, arranged and driven in the same manner as in Figs. 1, 2, and 3.

Fig. 10 represents a carrier consisting, simply, of an endless toothed belt or chain sustained by carrying rolls or pulleys across the rear end of the divider-board, and driven in the direction indicated by the arrow. The teeth upon the upper side of this belt, protruding above the upper surface of the divider-board and moving inward across the same, will act upon the grain and move the same toward the platform or conveyer in the same manner as the teeth described in the preceding forms of apparatus.

Fig. 11 represents a carrier consisting of a movable finger or picker, $p$, mounted at or near its middle upon a rotary crank, $k$, and sustained at its lower end upon one end of a pivoted link, $r$. The rotation of this crank causes the upper end of the finger to be thrust upward through or above the outer edge of the divider-board to engage the grain thereon, after which it is swept inward toward the platform and drawn downward beneath the board, after which it returns to its original position. If desired, two or more of these fingers operating alternately may be employed.

Fig. 12 represents a modification of the means for operating the carrier represented in Figs. 1, 2, and 3. In this case the shaft receives motion from one of the conveyer-chains upon the platform. This chain, provided with fingers and sustained by pulleys, as usual, is extended through and beyond the grain-board at the outer end of the platform, and has its sustaining-pulley located outside of said board, instead of inside, as usual. A bevel-pinion, $t$, applied to the shaft of this roller, engages with a corresponding pinion, $c$, on the lower end of the shaft $b$. In this manner motion is communicated from the conveyer-chain to the carrier or picker independently of the outer ground-wheel. In this case the carrier-chain will be sustained and driven at its inner end in the ordinary manner, and will be in all respects, except as to its extension beyond the grain-board, of ordinary construction and arrangement. The remaining conveyer-chains, of which there will be a series employed, as usual, may terminate inside of the grain-board in the ordinary manner.

Fig. 13 represents still another method of driving the picker. The picker-wheel, provided with a bevel-gear on its under side, is driven by a pinion, $a'$, attached to one end of a shaft, $b'$, which is sustained in fixed bearings on the under side of the divider-board or other fixed support. At its forward end the shaft $b'$ is provided with a bevel-pinion, $c'$, driven by a pinion, $d'$, on a shaft, $e'$. The shaft $e'$ extends backward, and is provided at its rear end with a bevel-pinion, $f'$, engaging in a corresponding pinion, $g'$, carried by a ground-wheel, $e$. The rear end of the shaft $e'$ is mounted in a box or bearing swiveled upon or around the ground-wheel, while the forward end of said shaft is mounted in like manner in a swiveled bearing, or bearing otherwise constructed to admit of its forward end rising and falling as the harvester-frame is adjusted vertically. This construction permits the vertical adjustment of the frame without interference with the connections of the driving-gear, and insures a positive action of the picker. The arrangement of the driving pinions and shafts above described may be applied, also, in connection with those forms of picker represented in Figs. 8, 10, and 11.

Fig. 14 represents still another arrangement of mechanism for imparting motion to the picker-wheel. In this arrangement the wheel carrying the teeth, or the chain provided with teeth, as before explained, is driven by a pinion, $j'$, which receives motion, through a pulley, $i'$, belt $k'$, and pulley $l'$, from the ground-wheel. A tightener or take-up device of any approved form, many of which are familiar to those skilled in the art, may be employed to compensate for the varying length of the chain as the machine is adjusted vertically from the ground-wheel.

Figure 15:
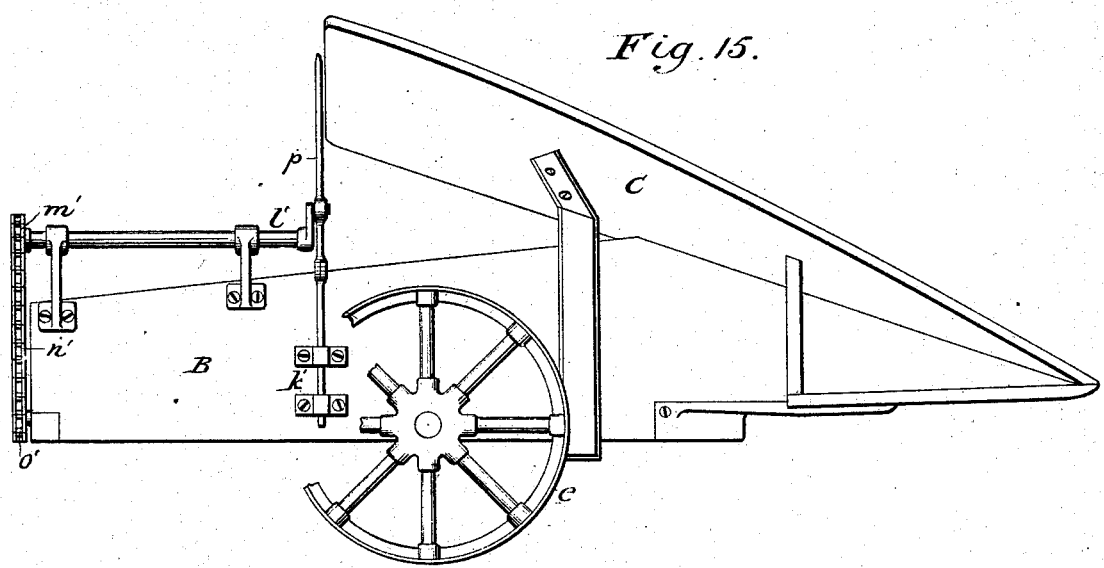
Figure 16:
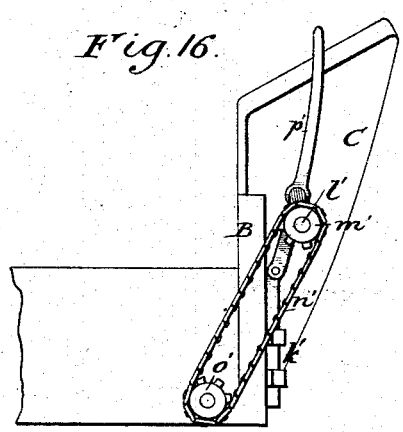

Figs. 15 and 16 represent another arrangement of a picker and driving mechanism. In this example the picker consists of a finger, $p'$, having a vibrating or circulatory motion. At its lower end it slides through a fixed guide, $k'$, while at its upper end it is carried by a crank on one end of a horizontal shaft, $l'$. This crank, seated in bearings upon the stationary grain-board or frame, is extended backward and provided with a sprocket-wheel or pulley, $m'$, driven by a belt or chain, $n'$, from a second pulley, $o'$, which latter is secured to or driven from the ordinary roll, which carries the conveyer chains or aprons.

Figure 17:
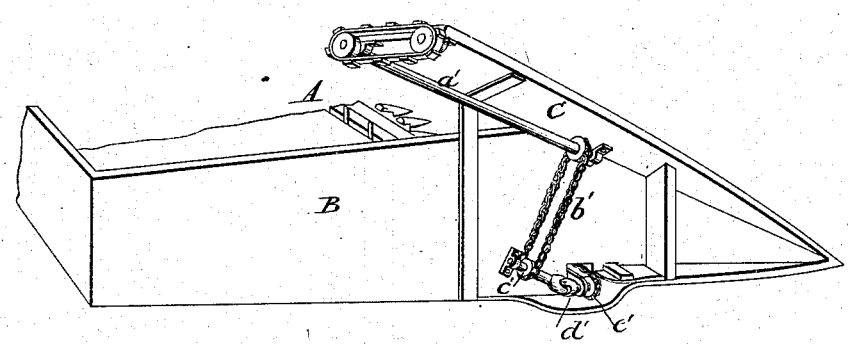

In Fig. 17 the picker or carrier consists of an endless belt provided with teeth or projections. This belt is sustained by two pulleys at the rear end of the divider-board C in such manner that its upper surface moves inward across and above the rear end of said board, for the purpose of acting upon the heads of the grain and moving the same. The inner pulley is mounted upon and driven by a shaft, $a'$, mounted in bearings on the under side of the divider-bar, and driven through a sprocket-wheel on its forward end by a chain, $b'$, passing through a pulley, $c'$. This pulley is mounted upon a shaft and supported in bearings on the outer end of the harvester, and connected by a universal coupling with a shaft, $d'$, bearing a pulley, $e'$, which carries one of the conveyer belts or chains before referred to.

Figure 18:
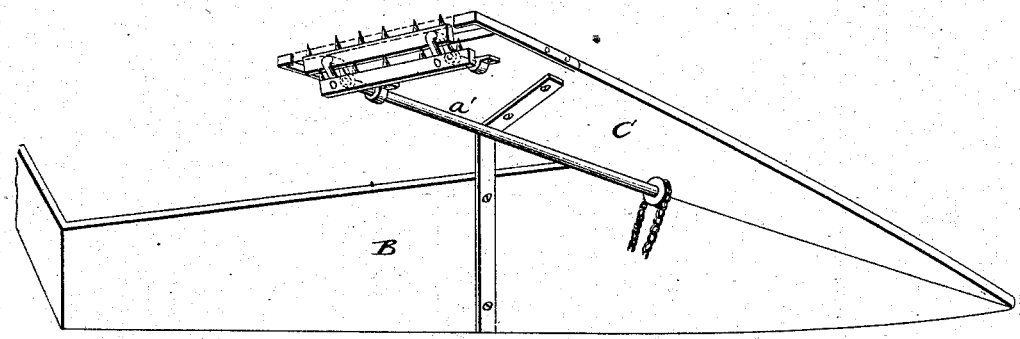

In Fig. 18 two alternately-acting toothed bars are mounted at their two ends on double crank-shafts. Each shaft has its cranks projected on opposite side of the center to give an alternate action of the bars. The inner crank is mounted upon a shaft, $a'$, which will be supported and driven in the same manner as the shaft in the preceding figure.

While I have represented in the drawings pickers and driving mechanisms differing in form and arrangement of details, it will be observed that they all act upon the same principle and in essentially the same manner and with the same effect, the grain being in each instance acted upon at or near its head only, and carried inward so as to fall instantly to the platform or the conveyer thereon. The action of the picker upon the heads of the grain only, and not upon the butts, is of importance, for the reason that a picker acting to advance the butts inward would cause the same to be acted upon and carried forward over the platform by the conveyer in advance of the heads, causing the grain to assume an oblique position across the platform. One aim of my invention is to cause the heads and butts of the grain to fall upon the conveyer as nearly as possible at the same instant and in line, and obviously this end would be defeated by any arrangement which would advance the butts before the heads fall a sufficient distance to encounter the devices acting thereon.

It is to be understood that the conveyer may consist of a series of parallel toothed chains, of reciprocating toothed bars, of an endless apron, or of any other suitable device, my invention having no relation thereto.

The present invention is restricted to those matters and things hereinafter claimed, and as to all matters which may be described or shown, but which are not claimed, the right is reserved to make the same the subject of a separate application.

Having thus described my invention, what I claim is—

1. In a harvesting-machine, the platform and cutters, in combination with the inclined divider-board, located at the outer end of the platform and extending rearward from the cutters, and an inwardly-acting carrier or picker, substantially as described, acting at or near the inner end of the divider-board and above the upper surface of the same, substantially as described, whereby it is caused to act upon the heads of the grain resting upon the divider-board and throw the same inward upon the platform.

2. In a harvesting-machine, the combination of the following members: a cutting mechanism, a horizontal grain-conveying mechanism located in rear of the cutter, a stationary dividing-board extending backward from the cutter, and a toothed carrier or picker acting transversely of the divider at or near the rear end of the same, and above the upper surface thereof.

3. In combination with the divider or grain-board, the revolving wheel provided with the rising and falling fingers.

4. In combination with the divider or grain-board, the revolving picker-wheel with folding fingers, the vertical driving-shaft connected thereto by a yielding joint, the ground-wheel, and the gears connecting said wheel with the driving-shaft, substantially as shown.

5. In combination with the ground-wheel, the harvester-frame adjustable vertically thereon, the picker located upon the harvester, a rotary shaft for imparting motion to said picker, and a driving mechanism connecting said rotary shaft with the ground-wheel, adjustable, substantially as described, to permit the rising and falling motion of the frame and picker.

6. In combination with the frame, ground-wheel, picker, and driving-gear, the shield or housing applied in the manner and for the purpose set forth.

7. In a harvesting-machine, a transversely-moving picker located above and in rear of the cutter-bar, and having one or more teeth to engage the heads of the grain only.

8. In a harvesting-machine, the combination of a stationary divider-board and a picker provided with a series of upright teeth adapted and arranged, substantially as described, to move transversely with respect to the divider-board and above the upper surface of the same, at or near its rear end.

JAMES F. GORDON.

Witnesses:
JAMES S. SACKETT,
WILLIAM N. COGSWELL.